United States Patent [19]

Van Dyke et al.

[11] Patent Number: 5,230,068
[45] Date of Patent: Jul. 20, 1993

[54] CACHE MEMORY SYSTEM FOR DYNAMICALLY ALTERING SINGLE CACHE MEMORY LINE AS EITHER BRANCH TARGET ENTRY OR PRE-FETCH INSTRUCTION QUEUE BASED UPON INSTRUCTION SEQUENCE

[75] Inventors: Korbin S. Van Dyke, Fremont; David R. Stiles, Sunnyvale; John G. Favor, San Jose, all of Calif.

[73] Assignee: NexGen Microsystems, Milpitas, Calif.

[21] Appl. No.: 485,304

[22] Filed: Feb. 26, 1990

[51] Int. Cl.⁵ .......................... G06F 12/08; G06F 9/30
[52] U.S. Cl. ................................. 395/375; 395/425; 364/DIG. 2; 364/243.41; 364/243.42; 364/261.3; 364/262.4; 364/938; 364/DIG. 1
[58] Field of Search ... 364/200 MS File, 900 MS File; 395/375, 425

[56] References Cited

U.S. PATENT DOCUMENTS

| | | | |
|---|---|---|---|
| 4,295,193 | 10/1981 | Pomerene | 364/200 |
| 4,442,488 | 4/1984 | Hall | 364/200 |
| 4,594,659 | 6/1986 | Guenthner et al. | 364/200 |
| 4,604,691 | 8/1986 | Akagi | 395/375 |
| 4,679,141 | 7/1987 | Pomerene et al. | 364/200 |
| 4,691,277 | 9/1987 | Kronstadt et al. | 364/200 |
| 4,722,050 | 1/1988 | Lee et al. | 364/200 |
| 4,775,955 | 10/1988 | Liu | 364/900 |
| 4,777,587 | 10/1988 | Case et al. | 364/200 |
| 4,777,594 | 10/1988 | Jones et al. | 364/200 |
| 4,796,175 | 1/1989 | Matsuo et al. | 364/200 |
| 4,802,113 | 1/1989 | Onishi et al. | 364/900 |
| 4,827,402 | 5/1989 | Wada | 364/200 |
| 4,847,753 | 7/1989 | Matsuo et al. | 364/200 |
| 4,853,840 | 8/1989 | Shibuya | 364/200 |
| 4,858,104 | 8/1989 | Matsuo et al. | 364/200 |
| 4,860,199 | 8/1989 | Langendorf et al. | 364/200 |
| 4,882,673 | 11/1989 | Witt | 364/200 |
| 4,894,772 | 1/1990 | Langendorf | 395/375 |
| 4,926,323 | 5/1990 | Baror et al. | 364/200 |
| 4,933,837 | 6/1990 | Freidin | 364/200 |
| 4,942,520 | 7/1990 | Langendorf | 364/200 |
| 4,943,908 | 7/1990 | Emma et al. | 364/200 |
| 4,984,154 | 1/1991 | Hanatani et al. | 395/375 |
| 4,991,078 | 2/1991 | Wilhelm et al. | 364/200 |
| 4,991,080 | 2/1991 | Emma et al. | 364/200 |
| 5,072,364 | 12/1991 | Jardine et al. | 395/375 |
| 5,093,778 | 3/1992 | Favor et al. | 395/375 |
| 5,136,696 | 8/1992 | Beckwith et al. | 395/375 |
| 5,136,697 | 8/1992 | Johnson | 395/375 |
| 5,142,634 | 8/1992 | Fite et al. | 395/375 |
| 5,163,140 | 11/1992 | Stiles et al. | 395/425 |

OTHER PUBLICATIONS

David R. Stiles and Harold L. McFarland; "Piperline Control for a Single Cycle VLSI Implementation of a Complex Instruction Set Computer"; *Computer Society of the IEEE;* pp. 504–508.

A. Thampy Thomas; "A Single Cycle VLSI CISC-Based Workstation: System Overview and Performance Characteristics"; *Computer Society of the IEEE;* pp. 500–503.

Atig Raza; "Technology Constraints on VLSI Processor Implementation"; *Computer Society of the Thirty-Fourth IEEE;* pp. 509–512.

*Primary Examiner*—Thomas C. Lee
*Assistant Examiner*—Krisna Lim
*Attorney, Agent, or Firm*—Townsend and Townsend Khourie and Crew

[57] ABSTRACT

A system which integrates the multiple instruction queues and the branch target cache (BTC) of a high performance CPU design into a single physical structure. Effectively, the queues are merged into the BTC in such a manner that, at any point in time, most of this structure functions as a BTC while certain entries function as instruction queues.

By using parts of the BTC to serve as instruction queues, the inefficiency of separate queue structures is eliminated and the queues are implemented with the greater device density characteristic of the RAM structure which the BTC core is based on. This merging of these structures also substantially simplifies the instruction queue control and the routing of instruction words between BTC entries and queues.

5 Claims, 10 Drawing Sheets

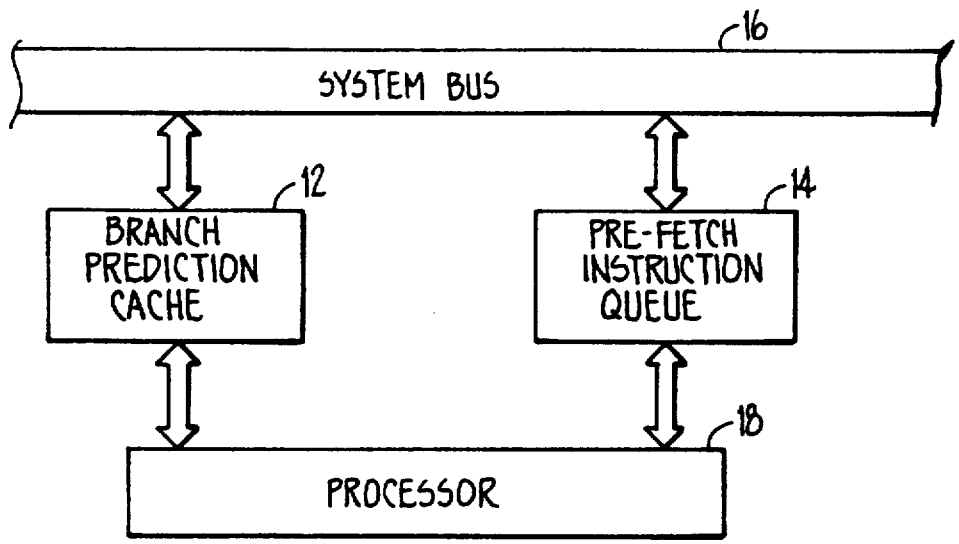
FIG._1. PRIOR ART
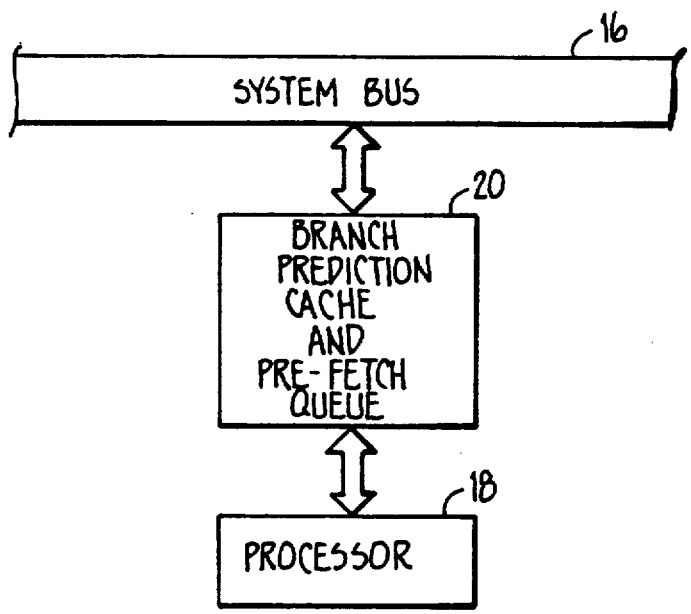
FIG._2.
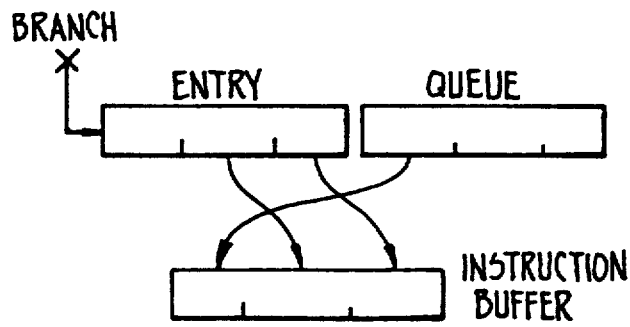
FIG._3.

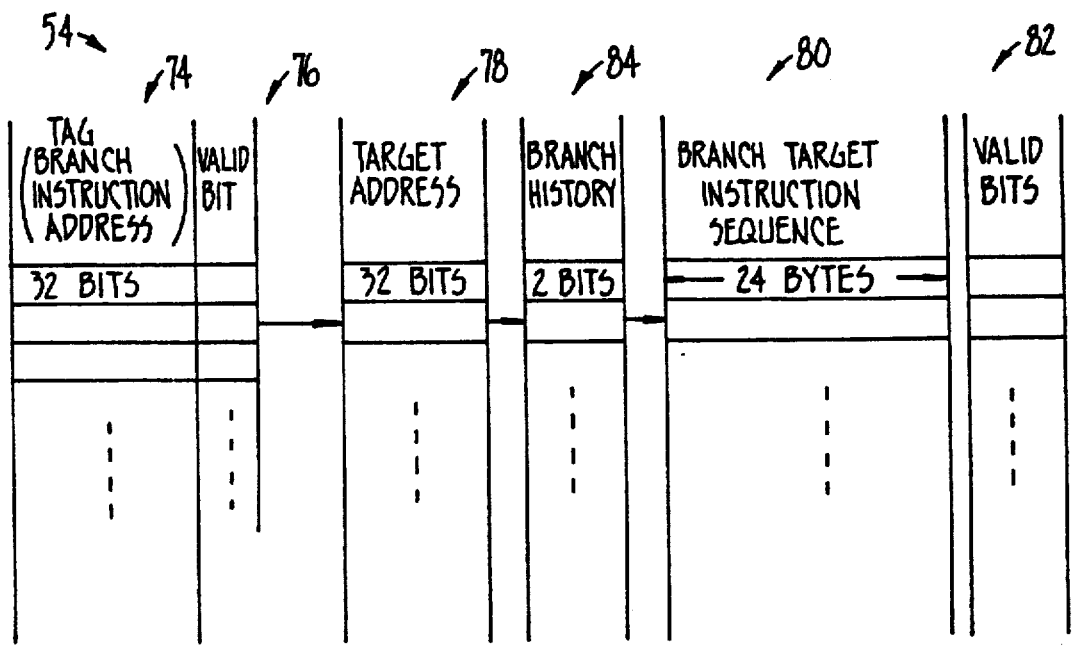
FIG._4.

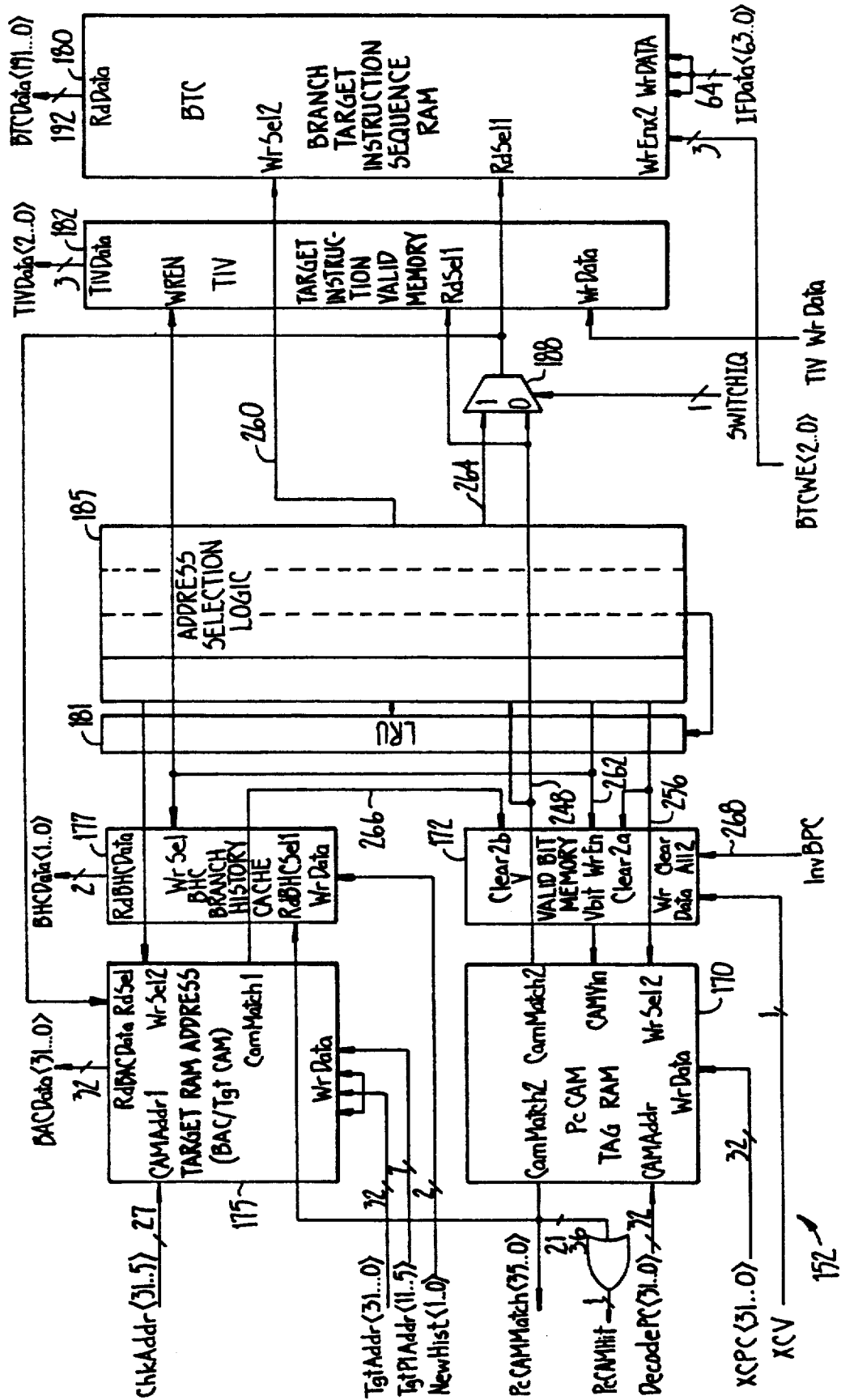
FIG._5.

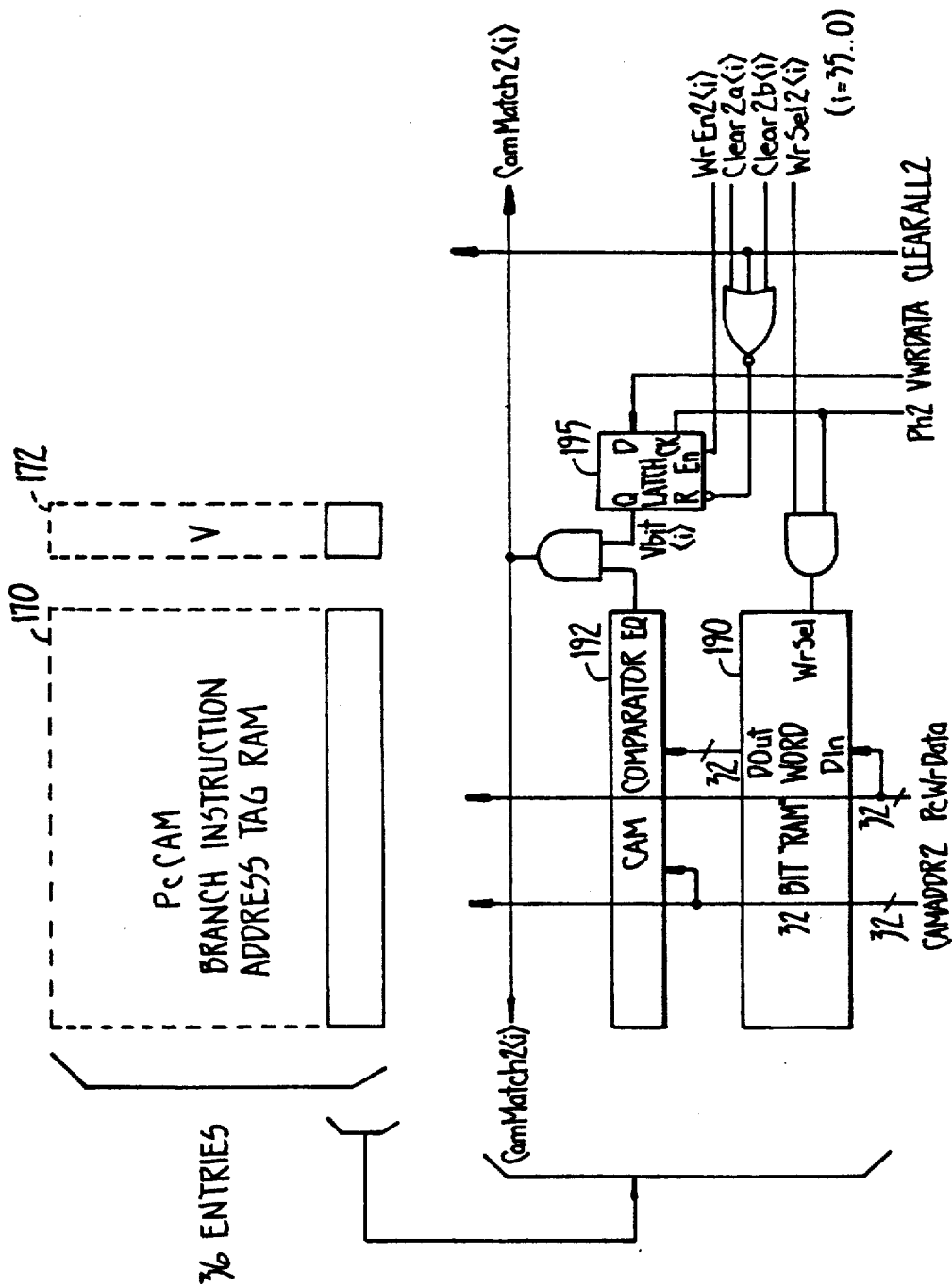
FIG._6.

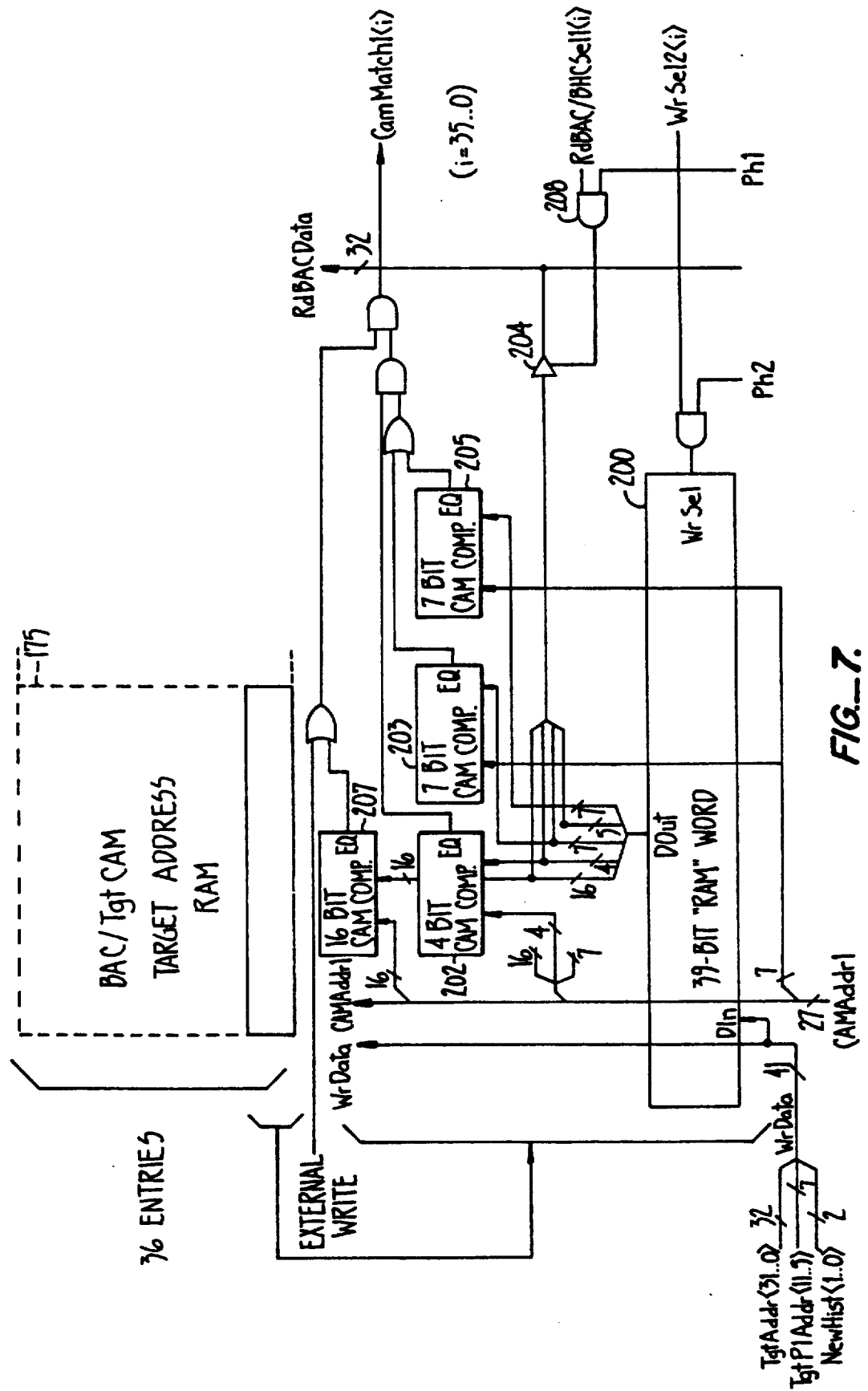
FIG._7.

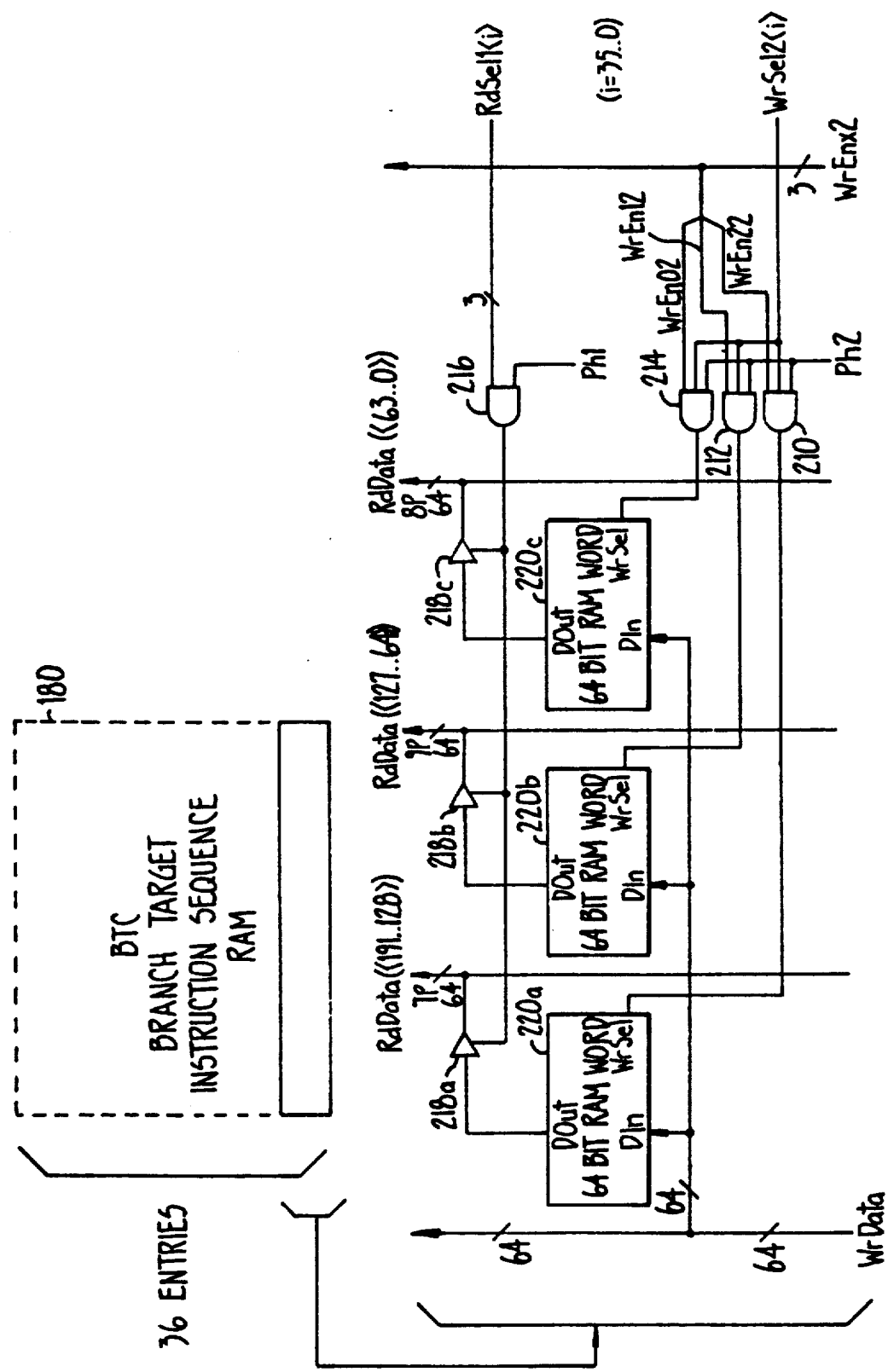
FIG._8.

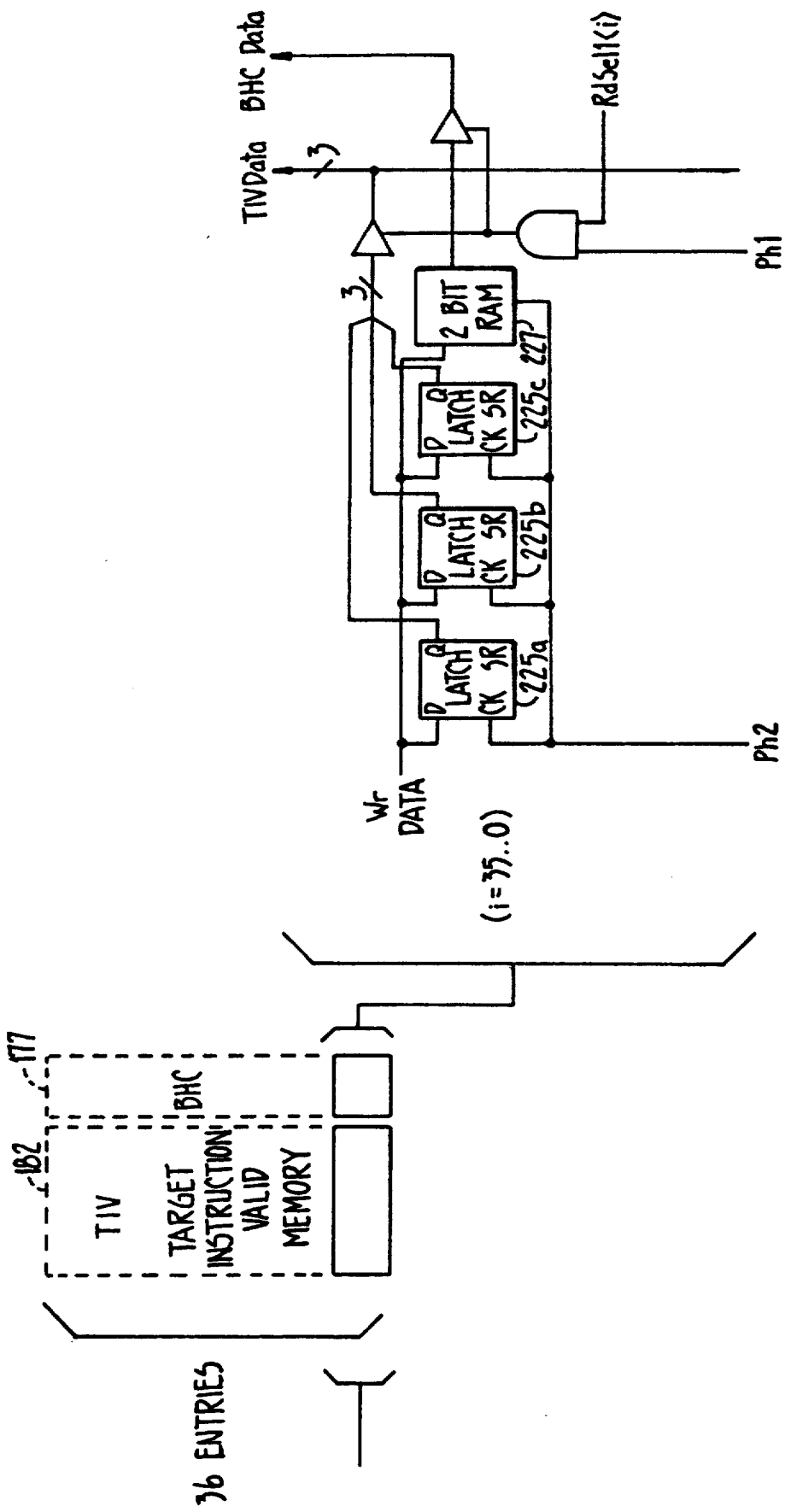
FIG._9.

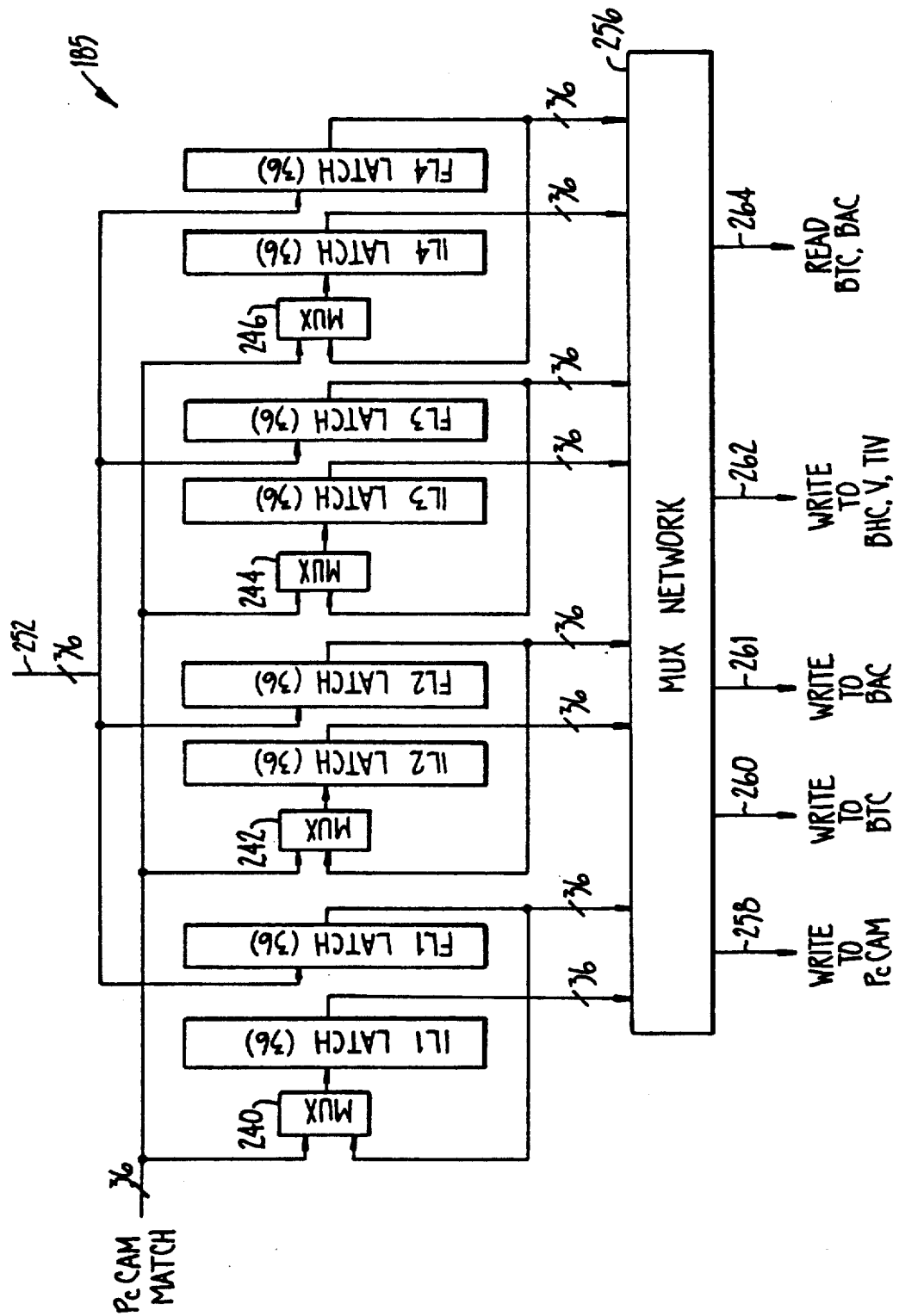
FIG._10.

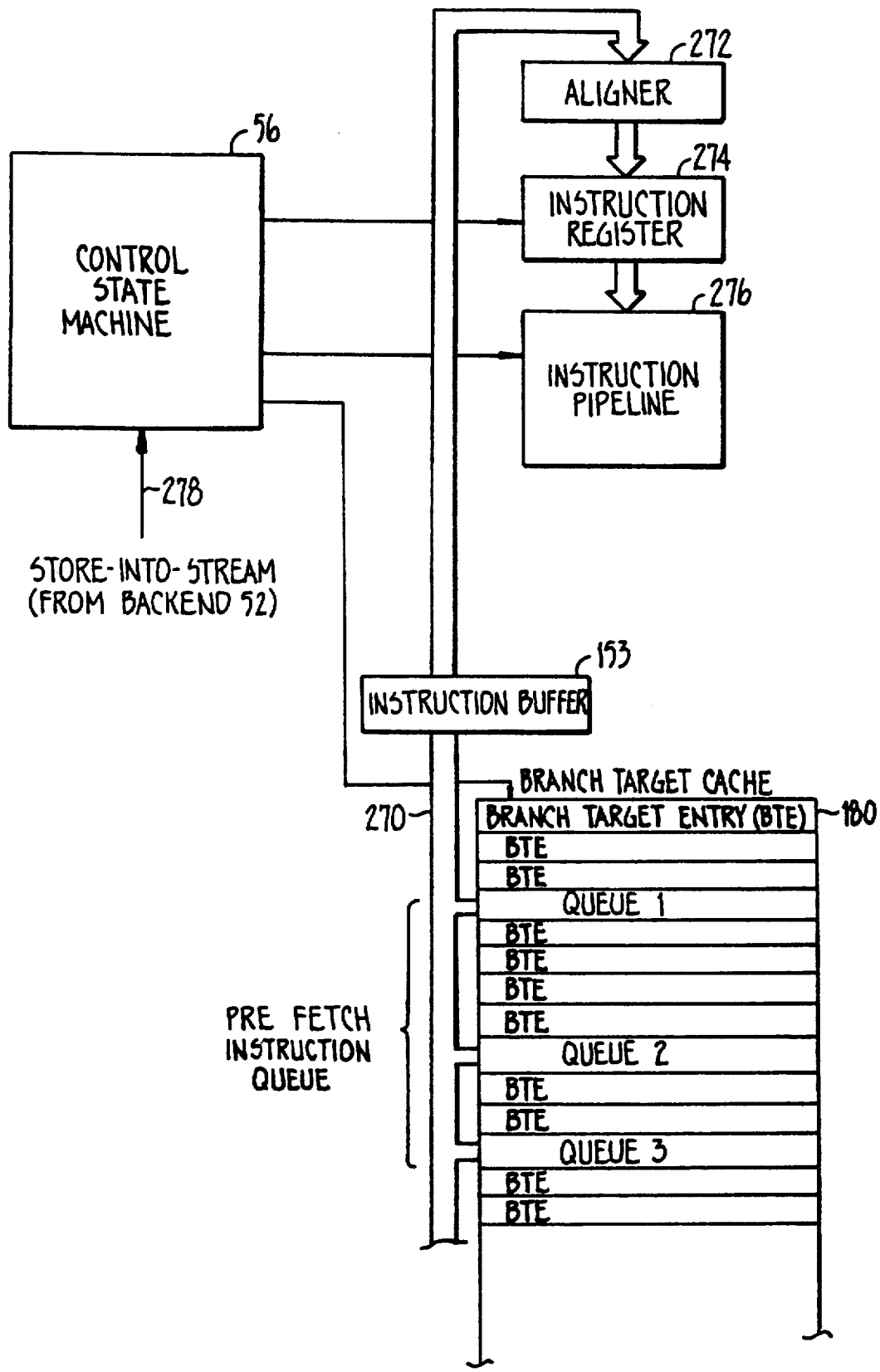
FIG._11.

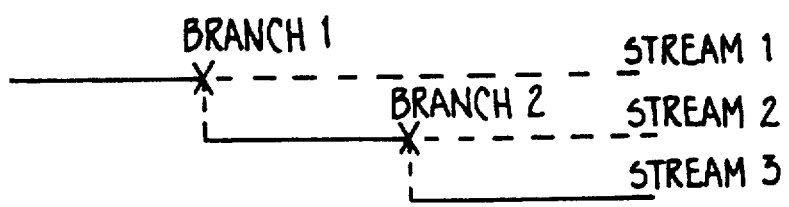
FIG._12.

CACHE MEMORY SYSTEM FOR DYNAMICALLY ALTERING SINGLE CACHE MEMORY LINE AS EITHER BRANCH TARGET ENTRY OR PRE-FETCH INSTRUCTION QUEUE BASED UPON INSTRUCTION SEQUENCE

BACKGROUND OF THE INVENTION

As computer designers have designed increasingly higher performance implementations of various computer architectures, a number of classes of techniques have been developed to achieve these increases in performance. Broadly speaking, many of these techniques can be categorized as forms of pipelining, caching, and hardware parallelism.

For most architectures, branching or (sequential) control transfer type instructions are an important class of instructions. For high performance implementations, this is particularly true due to the break in the sequential fetching of instructions that is implied by branches, jumps, calls, and returns. This stems from the attempt to maximize the pipelined, parallel processing of multiple instructions during each clock cycle. This characteristic results in the need to fetch subsequent instructions into the CPU pipeline at a rate approaching one per clock cycle.

While processing physically sequential instructions (in main memory), this is relatively easily attained since fetch address generation and instruction fetch latency can be appropriately pipelined. When a control transfer instruction is encountered, though, this instruction fetching process must be redirected to the target address of the instruction and fetching restarted. This inherently prevents fetching of the correct next instruction to be processed without delay, and is often further exacerbated by the need to first calculate the target address.

One technique that can be used to eliminate or hide the negative performance impact of control transfer instructions is to utilize a branch target cache (BTC). This structure functions as a specialized form of instruction cache which holds only the first several target instructions of a control transfer. By associating each BTC entry with the address or program counter of the control transfer instruction, the BTC can be accessed based on the fetch address of a control transfer instruction. By doing this in parallel with the decoding of what turns out to be a control transfer, the first target instruction can be "fetched" out of the BTC immediately after fetching of the control transfer instruction and substituted for the sequentially fetched instruction which is no longer desired.

The contents of the BTC entry are "fetched" or transferred into an instruction queue from which the CPU instruction decoder's instruction register is loaded. Depending on the typical instruction fetch latencies within an implementation, this queue may have the capacity to hold several words of fetched instructions. The capacity of a BTC entry may similarly be several words in size so as to hide the latency involved in restarting instruction fetching after a control transfer.

In any case, all of the instruction words in the BTC must be transferred to the instruction queue and in a sufficiently short period of time so as to not hold up the decoding of target instructions.

When a control transfer instruction is encountered without an associated BTC entry, instructions are, of course, fetched into the instruction queue directly from memory. In addition, a new BTC entry will be set up so that future encounters of the control transfer will find target instructions in the BTC. As instruction words are received from memory during this first encounter, they are also loaded into this new BTC entry.

While many CPU implementations employ a single instruction queue, higher performance designs will employ multiple queues in conjunction with parallel or interleaved fetching down multiple instruction streams. For example, the CPU will initially be processing one sequential instruction stream. When a conditional control transfer is encountered, a new stream is created starting at the target address. While the direction of the control transfer remains uncertain, fetching down both the sequential and target streams will be performed in conjunction with further pipeline processing down the stream predicted as more likely to be the correct branch direction. (Note that in the case of unconditional control transfers, the original queue can be immediately reused for the new fetch stream.)

Additional queues may also be present to support similar handling of further conditional control transfer instructions encountered on the predicted instruction stream while the first conditional control transfer remains unresolved. While a diminishing returns effect quickly sets in, usage of three instruction queues (and support for up to two unresolved conditional control transfers at a time) can be justified in very high performance implementations utilizing deep pipelining.

With CPU implementations such as this, though, substantial hardware costs can be incurred for the instruction queues themselves (each of which may be up to 32 bytes in size) for support circuitry for managing the queues and for routing instruction words between various elements. As conditional control transfers are encountered and as they are resolved as having been mispredicted, instruction processing must switch between the appropriate instruction queues. In parallel with this, interleaved fetching of instruction words in multiple queues and loading into associated new BTC entries must take place. As far as routing, the instruction register must be loadable from each of the queues; each queue loadable from the BTC and memory; and the BTC from memory in parallel with loading of a queue.

SUMMARY OF THE INVENTION

The present invention integrates the multiple instruction queues and the branch target cache (BTC) of a high performance CPU design into a single physical structure. Effectively, the queues are merged into the BTC in such a manner that, at any point in time, most of this structure functions as a BTC while certain lines function as instruction queues.

By using parts of the BTC to serve as instruction queues, the inefficiency of separate queue structures is eliminated and the queues are implemented with the greater device density characteristic of the RAM structure which the BTC core is based on. This merging of these structures also substantially simplifies the instruction queue control and the routing of instruction words between BTC entries and queues.

The instruction queues exist as distinct logical entities which are physically mapped into specific BTC lines, i.e., at any instant, for each logical queue, there is a selected physical BTC line which is utilized as the storage structure for that queue. While a BTC line serves as a queue, it is treated as an invalid and unavailable BTC entry. Over time, as is described below, this mapping or association of queues with physical BTC lines changes.

BRIEF DESCRIPTION OF THE DRAWINGS

FIG. 1 is a block diagram of a prior art branch prediction cache and separate pre-fetch instruction queue;

FIG. 2 is a block diagram of the integrated structure of the present invention;

FIG. 3 is a diagram illustrating the use of an entry and a queue;

FIG. 4 is a diagram showing the contents of the branch prediction cache of the present invention;

FIG. 5 is a diagram of the branch prediction cache according to the present invention;

FIG. 6 is a block diagram of the tag RAM of FIG. 5;

FIG. 7 is a diagram of the target address RAM of FIG. 5;

FIG. 8 is a block diagram of the branch target instruction sequence RAM of FIG. 5;

FIG. 9 is a block diagram of the target instruction valid and branch history memory of FIG. 5;

FIG. 10 is a diagram of the address selection logic of FIG. 5;

FIG. 11 is a diagram illustrating the pre-fetch queue in the branch target instruction sequence RAM of the present invention;

FIG. 12 is a diagram of the multiple instruction streams resulting from multiple branches.

DETAILED DESCRIPTION OF THE PREFERRED EMBODIMENT

Overview

In the preferred embodiment of this invention, support is provided for up to three active instruction queues. One queue, at any instant, is the current queue from which instruction words are being fed into the CPU's instruction decoder. The other queues are a mixture of pre-fetch queues and previously current queues that are still active.

Each queue is associated with a sequential instruction stream which is initiated by the encounter of a control transfer type instruction and which starts from the target address of the branch. In the case of unconditional branches, the current queue from which the branch was decoded can be reused as the new queue (which becomes again the current queue).

For conditional branches, though, the correct direction of the branch is generally not immediately resolved. Consequently, the current queue is retained and a new queue is set up for instruction fetching starting at the target address. Depending on which direction is predicted for the branch, one of these two queues will become the current queue from which subsequent instruction decoding proceeds. The other, if the new queue, will be used for pre-fetching down the target stream in case the branch was mispredicted and is, in fact, taken. The other, if the existing queue, will be retained in case the branch is, in fact, not taken; this saves the complications of re-fetching the sequential instructions after the branch which have already been fetched or were in the process of being fetched.

The third queue comes into play to support the handling of a further conditional branch instruction encountered down the predicted instruction stream while the first conditional branch remains unresolved. As with the first such branch, a new queue is set up, the direction is predicted, and processing continues down the predicted instruction stream.

Once the direction of the (first) conditional branch is resolved by the CPU, the queue(s) associated with the incorrect direction are deactivated and made available for usage as new queues in conjunction with further conditional branches.

FIG. 1 shows a prior art implementation of a branch prediction cache 12 and a pre-fetch instruction queue 14. Each of these is coupled between a system bus 16 and a processor 18. Each has its separate paths to the system bus and to the processor, respectively. When loading the pre-fetch instruction queue from the branch prediction cache, for example, the data must be transferred along the system bus or through the processor from the branch prediction cache to the pre-fetch instruction queue.

FIG. 2 is a diagram of the present invention showing the integrated branch prediction cache and pre-fetch queue 20. This single structure is positioned between system bus 16 and processor 18 and requires only a single data path in each direction, rather than the multiple paths of FIG. 1. In addition, instead of fetching instructions from the branch prediction cache into the queue, particular locations in the integrated structure are simply designated as a part of the queue dynamically. Thus, instead of moving the instruction data, the entries are simply renamed.

FIG. 3 illustrates what happens upon a branch. An entry in the BPC is pointed to as the target of the branch. The instruction words immediately following the entry are designated as the queue. Depending upon the particular alignment, the instruction pointed to could begin at different points within the entry. As shown in FIG. 3, for example, the second double word of the entry is at the beginning of the instruction, with the instruction being three double words long. The first double word of the queue is the last double word of the instruction. The entire instruction is loaded into the instruction buffer from the entry in the queue.

The branch prediction cache is illustrated in FIG. 4. To understand FIG. 4, it is best to review what a branch instruction is. The instruction causing the change in control flow is called the "branch instruction", and the address of this instruction is called the branch instruction address. The branch instruction may include within it the address of the instruction to be branched to, which is called the branch target instruction. The address of the branch target instruction is the "target address". Alternately, a formula for calculating the target address may be included in the branch instruction. In addition, the branch instruction may be a conditional branch. A conditional branch causes a jump to a branch target instruction only if a test set forth in the branch instruction is met. If the condition is not met, then the branch is not taken and sequential execution continues.

Returning to FIG. 4, the branch prediction cache contains a number of columns. A first column 74 contains a tag which identifies the cache contents for a particular line. That tag is the branch instruction address itself. A separate column 76 contains a valid bit for each entry, indicating if the entry is valid. Another column 78 contains the target address pointed to by the branch instruction whose address is given in column 74. At least the first byte of the actual branch target instruction itself (possibly the entire instruction), possibly along with sequentially occurring instructions after the branch target instruction, up to 24 bytes total, is set forth in a column 80. Thus, the first useful instruction in the 24 bytes is located at the address pointed to by the target address of column 78. A column 82 contains valid bits for each of the instruction word blocks in column 80. Finally, a branch history column 84 contains two bits indicating the direction of the branch during the past executions of that branch instruction. For example, the possible arrangement of the two bits in column 4 could be as follows where the two choices of the conditional branch are A and B:

| Bit Pattern | Branch History |
|---|---|
| 00 | AA |
| 01 | AB |
| 10 | BA |
| 11 | BB |

Details of BPC

FIGS. 5-10 show the BPC in more detail. FIG. 5 is a block diagram showing the various elements in BPC 152. The BPC comprises entries containing a relatively large amount of prediction information. In the preferred embodiment, this cache structure contains a full scope of information to enable single branch execution, including: the branch direction if the branch is conditional, the branch target address and cached target instruction data. More specifically, each cache line contains the target address from when the branch instruction was last executed; up to the first 24 bytes of sequential instruction stream starting at the target address; and two history bits recording the direction taken during past executions of the branch instruction.

To this end, BPC 152 includes the branch address tag memory, called a program counter content addressable memory (PcCAM) 170 with associated valid bit (Vbit) memory 172. The target address memory is a branch address cache/target CAM (BAC/TgtCAM) 175. The history of past branch directions is in a branch history cache (BHC) 177. A branch target cache (BTC) 180 contains the target instruction data, with an associated target instruction valid (TIV) memory 182 storing valid bits for the instruction data in BTC 180. Each of the memory arrays contains 36 lines and is directly accessed via word select inputs (as opposed to encoded word address inputs). Some of these sets of word selects for reading and writing each line are generated by address selection logic 185 with associated multiplexer 188. Other word selects are generated by the match outputs of PcCAM 170. A Least Recently Used (LRU) logic block 181 has logic which performs the function of selecting a BPC line to be overwritten by a new block of instruction data.

Given the relatively limited size of this cache, it is designed to support accesses in a highly associative manner versus a direct-mapped or two/four-way set associative manner. This look-up, to check whether an entry currently exists in the cache for a branch about to be processed, is typically performed using the address of the branch instruction. For some pipeline designs, a closely related address may instead need to be used.

In this context, the term fully associative means that bits of the input address are compared with potentially matching bits of all the entries in cache. A hit is defined to have occurred when the input address matches at least one stored address. The term direct mapped means that some number of bits of the input address are used to index into the memory, and the remaining bits are stored in the memory. When the entry is read out of the memory, the stored address bits are compared with the corresponding bits in the input address, and a hit is defined to have occurred when the two agree. This entails a single comparison. In the event that two branch instructions index to the same entry (different PC's with the same set of bits), a direct mapped cache can only accommodate one, even if there are other empty entries. The term two-way set associative refers to a structure with two memory banks, so that two entries are read out for a given index and two comparisons are performed. This concept can be expanded to more than two-way set associative.

In the preferred embodiment the address of the first byte of the next instruction to be decoded is used for the look-up in the BPC, and is done in parallel with instruction fetch completion and start of instruction decode. This look-up is also done in a fully associative manner which provides substantial performance improvement relative to direct-mapped or two/four-way set-associative access methods.

A cache tag for each entry, namely the instruction address of the branch associated with the entry, is stored in PcCAM 170. A cache look-up is performed by accessing PcCAM 170 using the above next instruction address, and then reading out the prediction information from any, but at most one, entry for which there was a tag match.

This greater associativity is with respect to both cache look-ups and cache replacements, i.e. when adding each entry to the cache a new entry to the cache requires that some other (hopefully less beneficial) entry be removed to make room. Through the greater flexibility in choosing "old" entries to be replaced by new entries, it is statistically possible to better approximate the ideal of retaining prediction information for the branches deemed most likely to be processed again in the near future and the most often. In essence, full associativity maximizes the prediction cache's hit rate for a given cache size (in number of entries).

An instruction buffer 153 (shown in FIG. 3) is used for temporarily holding instruction bytes before they are aligned and provided to the instruction register.

The circuitry will now be described with additional reference to a series of logic schematics. Each logic schematic for one of the memories shows the circuitry for one line in that memory. Since there are 36 lines, in BPC 152, the circuitry shown for a given memory is repeated 36 times for that memory.

FIG. 6 is a logic schematic of PcCAM 170 and associated Vbit memory 172. PcCAM 170 is a RAM/CAM array holding the instruction address of the branch for which each cache entry is storing prediction information. Each line in PcCAM 170 includes a 32-bit RAM word 190 and a CAM comparator 192. Each line in Vbit memory 172 holds a valid bit indicating the overall validity of the line, and is implemented as a latch 195. The CAM address input may be the address of the first byte of the next instruction to be decoded, and is compared with the contents of RAM word 190. In the event of equality, the CamMatch2 line for that entry is asserted, as qualified by a true output from Vbit latch 195.

The nature of PcCAM 170 supports fully associative BPC lookups and replacements. The CamMatch2 signal from each line is output for use by the other BPC components, while the RAM aspect of the array applies only to writing instruction addresses into the PcCAM.

FIG. 7 is a logic schematic of BAC/TgtCAM 175. The BAC/TgtCAM is a mixed RAM/CAM array holding the target address from the most recent execution. Each line includes a 39-bit RAM word 200, a 16-bit CAM comparator 207, a 4-bit CAM comparator 202, a pair of 7-bit CAM comparators 203 and 205, and associated logic. Of the 39 bits, 32 bits are the target address of the branch. The other 7 bits are additional target address information, as will be described below. The full 32-bit target address and the 2-bit history field are made available for readout if the particular BAC/TgtCAM line is selected, as determined by CamMatch2 from PcCAM 170 via mux 188.

The CAM segments of BAC/TgtCAM are used to detect memory stores by instructions currently being processed within the CPU pipeline or external writes or replacements. Since these instructions possibly modify target instruction bytes, it is necessary to invalidate the BPC entry in order to maintain proper coherency between target instruction bytes in the BTC and their image in main memory (actually in the ICache).

ICache RAM chip 30 contains 64 kilobytes, organized as 32-byte lines, and is thus characterized by an 11-bit address (the five low order bits may be ignored). The ITAG RAM contains the high order 16 bits. The 27-bit address ChkAddr of a line being written in the ICache is communicated to the CamAddr1 input of the BAC/TgtCAM. However, the BTC entry could straddle a line boundary, and so may be characterized by two line addresses. Thus, two target addresses (which may be the same) need to be stored and checked. In fact, the high order 16 bits need not be checked for an external write, because the BPC is constrained to have only entries which are in the I cache for external writes. All variations of the upper 16 bits of instruction addresses which have the same 11 bits below must share the same I cache line so only 11 bits of each address need to be checked. Two 11 bit addresses in the BPC are checked, covering the possibly two lines which could be spanned by a 24 byte BTC entry. By requiring that the two lines be in the same 4-kilobyte page (i.e., that the BTC entry not straddle a page boundary), the 4 most significant bits of the second 11 bit address will be the same as for the first 11 bit address, and can be ignored. To save space, the 7 bits of the second address are added to the same physical RAM word containing the 32 bit BAC address. CAM comparators 203 and 205 compare the two 7-bit fields of the RAM line with the corresponding 7 bits of ChkAddr on the CAM Addr 1 input while CAM comparator 202 compares the 4-bit field in the RAM line with the corresponding 4 bits of ChkAddr.

A match is defined to have occurred on a particular line if the 4 bits of the 27-bit ChkAddr match the 4 bits of the RAM line (as detected by comparator 202), the 7 bits of the ChkAddr match either 7-bit field of the RAM line (as detected by comparators 203 and 205) and the external write line is enabled or (for internal writes) the 16 bit field of ChkAddr matches the 16 bit field of the RAM line (as detected by comparator 207). If a match occurs (more than one can occur since more than one BTC entry can be affected by a write in a given line), the corresponding BPC entries are invalidated.

The 32 bit branch target address can be read out through driver 204 on data bus rdBACData.

FIG. 8 is a logic schematic of BTC 180. Each BTC slice comprises a 192-bit RAM word, implemented as three 64-bit RAM words (8 bytes) 220a, 220b, and 220c. Depending on the instruction length and alignment, the BTC possibly holds the first few instructions at the target address of the branch (in this case, up to the first 24 bytes of aligned target instruction data). In the context of the preferred embodiment, in which a CISC architecture possessing variable byte length instructions is implemented, the BTC cache caches the target instruction stream image as found in main memory. As an alternative, the first one or several target instructions could be cached in an alternate, possibly decoded, representation that may be more suitable for other CPU implementations.

Each 64 bit output is provided through drivers 218a, 218b and 218c, with each RAM word output forming a 64 bit portion of 192 bit rdData output bus. The read select signal for a particular one of the 36 lines is provided through an AND gate 216. The write select signals are provided through a series of AND gates 214, 212 and 210.

FIG. 9 is a logic schematic of TIV 182 and BHC 177. Each line of TIV 182 includes latches 225a, 225b, and 225c, each holding a valid bit corresponding to eight of the 24 instruction bytes within the BTC line. Each line of BHC 177 is a 2- bit RAM 127.

FIG. 10 is a logic schematic of address select circuitry 185. Four pairs of latches designated IL1, FL1 through IL4, FL4 are provided. The first latch (IL) in each pair stores a pointer to an entry in the branch prediction cache. Four sets are provided to track multiple branches. The second latch (FL) in each pair is provided to point to a pre-fetch instruction queue which may be associated with each branch.

One input to each of the IL latches is provided through multiplexers 240, 242, 244 and 246 from the PcCAM match line 248. Inputs to the FL latches are provided through a 36 bit input bus 252. The outputs of both the IL and the FL latches are provided to a multiplexing network 256.

The circuit of FIG. 10 provides a flexible approach to producing a number of control signal outputs from the multiplexing network 256, as discussed below. For example, a PcCAM match will provide a 1 bit on one of the 36 bit lines, with all the rest being zero. This could be written into IL latch 1, for instance, so that a single bit in latch IL1 is enabled. The output could then be provided to multiplexing network 256 to activate the appropriate control lines for that entry.

Integrated BPC Data Paths

In the context of a highly pipelined architecture, it is desirable to be able to perform several operations on the BPC at one time. For example, typical operations would be accessing the BPC on every cycle. It might be desired to store target bytes in the BTC, to invalidate an entry, or to update the history bits. As will be described in detail below, address select logic 185, PcCAM 170, and BAC/TgtCAM 175 provide various select and enable signals to control reading, writing, setting and clearing of addresses, instructions, and valid bits. The integrated BPC structure allows any number of these operations to be performed in the same cycle for different entries without contention of competing elements.

1. Read an Entire BPC Entry on a PcCAM Match

A first access path, used to access the BPC entry, is invoked by communicating a 32-bit DecodePC signal to the CamAddr2 input of PcCAM 170. If a match occurs, a single bit of the 36-bit CamMatch2 output 248 is asserted, and is communicated to read select inputs on the other memory elements, namely BAC 175, BHC 177, BTC 180, and TIV 182 via mux 188. The result is that the corresponding entries, constituting the entire BPC entry, are read out of respective data outputs of the memory elements.

2. Write to PcCAM

A second access path, used to clear an old entry and start a new entry, is invoked by writing a 36 bit word, with all 0's except for a single bit, which has a 1, into one of the latches of FIG. 10 through input 248 and multiplexers 240, 242, 244, and 246. The desired 32-bit address to be stored is provided to the WrData input of PcCAM 170 (see FIG. 5). The output 258 of multiplexer network 256 is selected to assert signals at the WrSel2 input of PcCAM 170, and the Clearza input of Vbit memory 172. This enables writing a new entry into the PcCAM, and clears the valid bit, pending acquisition of the target bytes. The same latch is used as a pointer for the BTC write, BAC write and BHC, V and TIV writes for that entry.

One latch pair in address select logic 185 is a working latch pair which is not being used to track a particular branch at that time. The use of four sets of latches allows three instruction streams to be kept active (the original stream and two branches), while the fourth pair of latches is used for working purposes such as writing to PcCAM. The output of each FL latch, which is written to through address input 252, is also coupled back through the multiplexers 240-246 so that it can be written into the IL latch as desired.

In practice, the FL is loaded for access (2), a write to PcCAM. It remains unchanged throughout (3)-(6) style accesses below if there is a hit. If there is a miss and an entry is created, then the FL is reloaded to point to a new queue. Accesses (3)-(6) may then occur.

Similarly, IL is loaded when there is a hit with the PcCAM output. It is then used for accesses (3)-(6).

3. Write to BTC

A third access path is used to fill in the BTC. The line is pointed to by the latch pointing to the PcCAM portion of the line. Three 8-byte select signals are provided to the WrEnx2 input of BTC 180. A single 8 byte block to be stored for the selected entry is provided to the WrData inputs on BTC 180. This allows part of a BTC entry to be written as multiplexer network 256 output 260 asserts select signals at inputs to the WrSel2 input of BTC 180.

4. Write to BAC

A fourth access path is used to write 39 bits of target address to the WrData inputs of BAC/TgtCAM 175 when the target address is available.

5. Write to BHC, V and TIV

For a fifth access path, a valid data bit is provided to the WrData input of Vbit memory 172, 3 bits are provided to TIV 182 and 2 bits of history information are provided to the WrData inputs of BHC 177. This allows completion of the BPC entry as output 262 of multiplexer network 256 is selected.

6. Read BTC and BAC

A sixth data path is invoked by referencing one of the IL or FL latches as output 264 of multiplexing network 256. A select signal is also provided to multiplexer 188. This allows a given BTC and BAC line to be read out independently of any CAM hit from PcCAM 170. The entire BTC entry can be read, or one or more of the three double-words in the BTC entry can be read. This provides flexibility that allows certain otherwise unused BTC entries to be used for other purposes (such as instruction queues) and be controlled independently.

7. Consistency Check of BAC

A seventh access path is invoked by communicating ICache address information to the CAMAddr input of BAC/TgtCAM 175 for an external write to the I cache. As mentioned above, the CAM portion of BAC/TgtCAM 175 performs the function of maintaining consistency between the target instruction bytes in BTC 180 and corresponding bytes in main memory (actually in the instruction cache). A match causes assertion of the appropriate CamMatch1 output line 266, and clears the corresponding Vbit.

8. Invalidate All 36 BPC Entries

An eighth access path is invoked by asserting a signal at the ClearAll2 input 268 of Vbit 172. This can be carried out in a manner independent of other ongoing operations, and in some sense supercedes them all, because it invalidates all the BPC entries.

Pre-Fetch Queue Implementation

The pre-fetch instruction queue is preferably implemented using one of the 36 entries of BTC 180 as shown in FIG. 11. A control state machine 56 keeps track of which of the 36 entries is the instruction queue. In fact, three entries are used for three queues in the preferred embodiment. In the event a conditional branch is encountered in one queue, that queue is retained while a separate queue for the predicted branch is set up and used. In case the predicted branch turns out to be a mispredicted direction, instruction execution can return to the first queue without having to rewrite it into the BTC. A third queue is provided in case there is a further conditional branch during execution of the second queue. This could result in 3 possible outstanding streams as shown in FIG. 12.

Each queue contains three 8 byte blocks of instructions. The instruction words are provided in order on a 192 bit instruction bus 270 to instruction buffer 153. The words are then aligned by aligner 272 and are provided to instruction register 274 with the instruction aligned to start at the beginning of register 274. The instructions are then provided through an instruction pipeline 276, with each instruction being tagged and tracked as discussed earlier.

Fetching down a queue wraps around and overwrites the three 8 byte blocks irrespective of the processing of the fetched instructions. An 8 byte block is free for overwriting (via a newly fetched block) as soon as the decoder has completely decoded all instructions contained in the block.

However, if a branch is found in a stream, and it is predicted taken, then no further 8 byte blocks will be freed (consumed) until the branch is completed and found to be not taken. Thus, during the processing of the branch the queue is "frozen". If the branch found in the stream is not taken, then no such restriction exists, the 8 byte block containing the branch may be overwritten before the branch is completed.

By utilizing a similar organization for the instruction queues and for BTC entries, it is possible to utilize BTC entries as the actual storage elements of instruction queue contents. Further, and equally as important, is that the shuffling of multiple instruction double-words en masse between queues and BTC entries, is eliminated. The problem instead becomes one much more simply of naming.

At any point in time, one BTC line per active queue is allocated to serve as that queue, and during this time the (entire BPC) entry is marked as invalid insofar as BPC accesses are concerned. This is a dynamic assignment in that each time a new instruction stream is initiated and an instruction queue allocated for that stream, a BPC entry is assigned to be the new queue. Typically, a BPC entry which functions as a previous queue is used to avoid writing over active BPC entries. When an additional queue is needed, choice of entry is based on the same algorithm used during normal BPC replacements for selecting the "least useful in the future" entry.

Also, in conjunction with this, is the usage of a modified instruction register or instruction buffer. (This register is loaded from an instruction queue with the next instruction words to be decoded by the CPU's instruction decoder.) This register is expanded to be able to hold an entire copy of the current instruction queue instead of just a portion. As is explained below, this eliminates the need for an additional read access path out of the BTC RAM array.

During normal CPU operation, the integrated instruction queue/BTC is managed as follows. While the next instruction is being decoded, the address of this instruction is looked up in the BPC and an associative read access of the BTC is performed. If this instruction is, in fact, a control transfer and it "hits" in the BPC, then the contents of the accessed BTC entry is read out and loaded into the decoder's instruction register. This BTC entry effectively serves as an initial instruction queue for the target instruction.

While further sequential target instruction bytes are fetched, a new queue is allocated from the existing pool of BPC/BTC entries. As these instruction bytes are received, they are loaded into this line being used as a queue and also in parallel directly into the instruction register. This avoids additional latency for the instruction data to become available to the instruction decoder, as well as eliminating the need to continually access the BTC to obtain further instruction words for loading into the instruction register.

In the case that a newly decoded control transfer instruction "misses" in the BPC, the decoder's instruction register is simply initialized empty and, as before, a new queue is allocated. Fetching of instructions is initiated from the target address, and received 8 byte blocks are loaded in parallel into both the new queue and the instruction register.

If, when the transfer control instruction has been sufficiently processed through the CPU pipeline, it is decided to create a BPC entry for this instruction, this new queue is simply renamed or turned into a valid BPC entry. To ensure that this has the proper result, though, one constraint must be applied which in practice has insignificant performance impact. As this new queue is filled with target instruction blocks, they must all be retained even though the instruction decoder may already be finished referencing some of them.

In effect, once the first three target instruction 8 byte blocks have been received, the queue must be frozen. This is in contrast to a normal queue, which is managed as a circular buffer with the oldest data being overwritten by new received data after the old data is no longer needed by the decoder.

In the preferred embodiment of this invention, a further queue is not immediately allocated to support further fetching. Instead, fetching is suspended until a decision is made regarding whether or not to create a BPC entry for the transfer control instruction. If not, then either the existing "new" queue can proceed to function as a normal queue, or the target stream is not actually taken and the queue is simply deactivated. If so, then the BPC line that would have more conventionally been selected to be replaced (and to serve as the new entry), is invalidated and allocated as a replacement queue for the one being turned into the new BPC entry. Further instruction fetching then continues using this newest BTC line as a normal queue.

Note that the support by the CPU design for up to two unresolved conditional control transfers translates into a need for three instruction queues, one for the instruction stream containing the oldest branch and one for each of the target streams initiated by the two branches. The limiting by the CPU to at most two such branches at a time effectively eliminates the need for more than three queues to be allocated at a time. Whenever a new queue needs to be allocated, an existing queue is deactivated or an old queue is made available (as described in the previous paragraph). In essence, the labeling of three BPC/BTC lines as queues (instead of valid entries) constantly shifts around as new queues are allocated and old ones are turned into new BPC entries.

One critical note regards when a conditional control transfer is resolved and turns out to have been mispredicted. In this case, the queue associated with the predicted stream is discarded (as mentioned above) and instruction decoding must be switched to the other queue. This latter point requires that this other queue (which may be a BPC entry if the branch is, in fact, to be taken) be accessed from the BTC and its contents loaded into the decoder's instruction register.

This is not a normal BTC read access, but then again (in the preferred embodiment of this invention) this does not take place during normal instruction decoding and processing. Instead, a special one clock "abort" cycle takes place during which the CPU pipeline is appropriately flushed and instruction decoding and processing restarted down the correct instruction stream. During this cycle the BTC entry and queue being "switched to" is accessed via selection information stored in the BPC. Thus, the associative read access of the BTC during normal processing cycles and this special read access during abort cycles are mutually exclusive and are able to share one physical read access path.

What is claimed is:

1. A cache memory system comprising:
   a cache memory having a plurality of memory lines for storing both branch target cache entries and at least one pre-fetch instruction queue;
   first means, operatively connected to said cache memory, for designating a majority of said lines as branch target entries containing branch target instruction words;
   second means, operatively connected to said cache memory, for designating a minority of said lines as pre-fetch instruction queues;

control means, operatively connected to said first and second means, for dynamically altering, in accordance with an instruction sequence, the designations as either branch target entries or pre-fetch instruction queues of said cache memory lines, such that a single cache memory line can alternately be a pre-fetch instruction queue and a branch target entry;

an instruction buffer coupled to said cache;

wherein said control means including means for transferring instructions from a cache memory line currently designated as a pre-fetch instruction queue to said instruction buffer without requiring an intermediate transfer to a separate pre-fetch instruction queue location.

2. The cache memory of claim 1 further comprising valid bits for indicating the validity of said lines containing valid branch target entries and means for invalidating said valid bits for lines designated as pre-fetch instruction queues.

3. The cache memory of claim 1 further comprising:

means for fetching initial instruction words into one of said pre-fetch instruction queues upon a branch to an instruction not in said cache memory; and control means for determining if said initial instruction words in said pre-fetch instruction queue should be designated as a branch target entry, and for preventing further fetches into said pre-fetch instruction queue until said determining is completed.

4. A cache memory comprising:

a plurality of memory lines for storing both branch target cache entries and at least one pre-fetch instruction queue;

first means, operatively connected to said cache memory, for designating a majority of said lines as branch target entries containing branch target instruction words;

second means, operatively connected to said cache memory, for designating a minority of said lines as pre-fetch instruction queues;

means, operatively connected to said first and second means, for dynamically altering, in accordance with an instruction sequence, the designations as either branch target entries or pre-fetch instruction queues of said cache memory lines, such that a single cache memory line can alternately be a pre-fetch instruction queue and a branch target entry;

means for predicting the direction of a branch instruction;

means for detecting a mispredicted branch direction;

means for aborting partial instruction decoding when a mispredicted branch direction is detected; and means for reading from a main memory both a branch target entry and an initial pre-fetch instruction queue for an other than predicted direction of a branch while the actual direction of said branch is being determined.

5. A cache memory comprising:

a plurality of memory lines for storing both branch target cache entries and at least one pre-fetch instruction queue;

first means operatively connected to said cache memory for designating a majority of said lines as branch target entries containing branch target instruction words;

second means operatively connected to said cache memory for designating a minority of said lines as pre-fetch instruction queues;

means operatively connected to said first and second means for dynamically altering, in accordance with an instruction sequence, the designations as either branch target entries or pre-fetch instruction queues of said cache memory lines, such that a single cache memory line can alternately be a pre-fetch instruction queue and a branch target entry;

valid bits for indicating the validity of said lines containing valid branch target entries and means for invalidating said valid bits for lines designated as pre-fetch instruction queues;

means for fetching initial instruction words into one of said pre-fetch instruction queues upon a branch to an instruction not in said cache memory;

control means for determining if said initial instruction words in said pre-fetch instruction queue should be designated as a branch target entry, and for preventing further fetches into said pre-fetch instruction queue until said determining is completed;

means for predicting the direction of a branch instruction;

means for detecting a mispredicted branch direction;

means for aborting partial instruction decoding when a mispredicted branch direction is detected; and means for reading from a main memory both a branch target entry and an initial pre-fetch instruction queue for an other than predicted direction of a branch while the actual direction of said branch is being determined.

* * * * *